United States Patent
Deiss et al.

[11] Patent Number: 5,911,548
[45] Date of Patent: Jun. 15, 1999

[54] TOOL FOR THE PRODUCTION OF ARC-SHAPED GROOVES

[75] Inventors: Siegfried Deiss, Gomaringen; Rolf Huber; Rolf Vollmer, both of Tübingen, all of Germany

[73] Assignee: Walter AG, Tübingen, Germany

[21] Appl. No.: 08/803,386

[22] Filed: Feb. 20, 1997

[30] Foreign Application Priority Data

Feb. 27, 1996 [DE] Germany .......................... 196 07 230

[51] Int. Cl.⁶ .................................................. B23D 7/00
[52] U.S. Cl. .............................. 409/234; 407/12; 407/40; 407/61
[58] Field of Search ............................. 409/234; 407/12, 407/21, 20, 29, 33, 34, 40, 42, 53, 61, 63

[56] References Cited

U.S. PATENT DOCUMENTS

| | | | |
|---|---|---|---|
| 1,472,960 | 11/1923 | Conklin | 407/29 |
| 3,716,900 | 2/1973 | Erkfritz | 407/40 |
| 3,859,700 | 1/1975 | Jilbert . | |
| 4,182,587 | 1/1980 | Striegl | 407/61 |
| 4,645,384 | 2/1987 | Shimomura et al. | 407/42 |
| 4,790,693 | 12/1988 | Koblesky | 407/42 |
| 4,808,044 | 2/1989 | Tsujimura et al. | 407/61 |
| 4,993,891 | 2/1991 | Kaminiski et al. | 407/42 |
| 5,033,916 | 7/1991 | Dunklau | 407/34 |
| 5,176,500 | 1/1993 | Henig . | |
| 5,542,792 | 8/1996 | Krueger et al. | 409/234 |
| 5,542,794 | 8/1996 | Smith et al. | 407/61 |

FOREIGN PATENT DOCUMENTS

| | | | |
|---|---|---|---|
| 2270045 | 12/1975 | France . | |
| 3727968 | 2/1988 | Germany | 407/34 |

OTHER PUBLICATIONS

"Methoden und Maschinen zur Fräsbearbeitung von Generator– und Turbinenrotoren" (Methods and Machines for Milling Generator and Turbine Rotors), Ing. (grad.) Siegfried Neumann, Special Publication No. 9 of Köllman Maschinenbau GmbH, 5602 Langenberg/Rhld, (1969).

*Primary Examiner*—Daniel W. Howell
*Assistant Examiner*—Adesh Bhargava
*Attorney, Agent, or Firm*—Frishauf, Holtz, Goodman, Langer & Chick, P.C.

[57] ABSTRACT

To form undercut grooves in a work piece, especially to retain turbine rotor blades, in a first step, the grooves are cut such that the flanks of the grooves have a preliminarily desired shape; then, in a second step, a bell-type countersink is moved radially to cut the desired shape of the flanks of the groove. Countersink cutters for the second step include a plurality of groups of cutting bits or inserts secured to posts on a shell, or bell-type countersink, in accordance with the profile to be cut.

19 Claims, 7 Drawing Sheets

TOOL FOR THE PRODUCTION OF ARC-SHAPED GROOVES

Reference to related patent and application, the disclosure of which is hereby incorporated by reference: U.S. Pat. No. 3,859,700, Jilbert.

U.S. application Ser. No. 08/803,389, filed Feb. 20, 1997, DAUB.

FIELD OF THE INVENTION

The invention relates to a process and a device for cutting or machining arc-shaped grooves, in particular arc-shaped rotor grooves, e.g. in the manufacture of turbine rotors.

BACKGROUND

Turbine rotors, for example those used in steam turbines, have an essentially cylindrical base unit, on which several disc-shaped cylindrical sections or rings are formed. These are provided on their periphery with spaced grooves to receive the turbine blades, the flanks of which are toothed in the longitudinal direction of the grooves. The grooves therefore have a branched, tapering, stepped profile (see FIGS. 1A and 8A), hereinafter called "Christmas tree" profile, which serves to positively receive and secure a foot of a turbine blade. In this case, straight grooves running in the longitudinal direction as well as oblique grooves and grooves in the shape of a circular arc are known.

A process and device for forming rotor grooves in the shape of circular arcs when viewed from the side are known from the article "Methoden und Maschinen zur Fräsbearbeitung von Generator-und Turbinenrotoren" [Methods and machines for milling generator and turbine rotors], Ing. (Grad.) Siegfried Neumann, special publication No. 9 of Köllmann Maschinenbau GmbH, 5602 Langenberg/Rhld. The circular arc-shaped grooves are constructed from a blank with disc-shaped cylinder sections. A milling machine is used to manufacture the grooves. The machine has a tool spindle which is mounted to be axially adjustable. The axial direction of the tool spindle essentially corresponds to a radial direction of the tool or is parallel thereto. One special bell-shaped cutter, termed a "bell cutter" or "shell milling cutter" is attached to the tool spindle; its tool base unit has the shape of a circular plate with an axially projecting edge. The contour of the edge, viewed in longitudinal section, has cutting elements bearing cutting edges. The circumferential outline of the cutting edges determines the contour of the groove to be cut in a rough cutting process and initially coarsely pre-shaped. The profile is composed of several rectangles and tapers towards the edge of the bell cutter in stages. It is free from undercuts and serves merely to open a roughly cut pre-contoured groove.

A circular milling machine is used to shape and finish the groove. The milling machine moves and guides a shank-type profile cutter in forward feed on a circular arcuate path along the groove. The shank-type cutter has a profile which corresponds to the shape of the groove flank to be produced. The shank-type profile cutter has undercuts relative to the radial direction of the work piece, e.g. the turbine rotor.

Because of the large profile depth required for construction of the undercuts and the long cutting path corresponding to the groove length, milling with the shank-type cutter requires a long manufacturing. With a larger number of grooves distributed along the periphery of the turbine rotor, this adds to a considerable total operating time which, in an example can amount to appreciably more than 5 hours for the grooves on one circular periphery alone. The long machine time required results in high production costs in the manufacture of turbine rotors.

THE INVENTION

It is an object of the invention to provide a process and a device for constructing profiled, arc-shaped grooves, in shorter machining time than heretofore.

Briefly, a bell-type countersink has a ring-shaped support section, on the plate seats of which indexable and/or reversible cutting bits, or inserts, or cutting plates are held. The support section fitted with indexable and/or reversible bits or cutting plates is in this case fixed in its dimensions so that it can be introduced into a pre-roughed, i.e. opened, groove which does not have undercuts, without the reversible cutting plates coming into contact with the work piece. All the undercuts can be made essentially simultaneously and in a short time by a short radial free motion, the extent of which corresponds essentially to the depth of the undercuts to be constructed.

The bell-type countersink permits a drastically reduced machining time in relation to milling with conventional profiling cutters. While the conventional profiling cutter, typically a shank-type cutter, must cut out the entire profile depth in a forward feed movement corresponding to the length of the groove, the bell-type countersink can remove the same amount of material in a short lateral feed motion. Each cutting bit of the bell-type countersink is guided over the entire length of the groove flank on each rotation of the tool. The chip production is high in this case.

The feed motion is a straight lateral displacement of the bell-type countersink. This may be achieved in a simple manner. There is no programming of the curved feed path with this processing step, as is required in the prior art.

The cutting edges of the bell-type countersink are bit by bit distributed over the indexable and/or reversible cutting bits, or cutting plates, the overlap of the edges determines the contour to be milled. Because there is adequate space for arrangement of the indexable cutting bits around the periphery of the support section of the base unit of the tool, it is possible to also cut out relatively narrow grooves with the bell-type countersink fitted with such indexable and/or reversible cutting bits. The indexable cutting bits may be replaced, where necessary, or used again in a different position; this has a beneficial effect on the tool costs.

In comparison to the cutter and method of this invention, a profiling cutter constructed as a shank-type cutter of the prior art generally cannot be fitted with cutting bits because of the tight space conditions with the groove dimensions usual for rotor grooves. Therefore, specially shaped or profiled superspeed steel cutters are used which must be totally reground when worn, or dull. However, when using the bell-type countersinks according to the invention, superspeed steel cutters may possibly be required only for final finishing the groove which has been pre-milled already with the undercuts.

The ring-shaped support section can be interrupted by a series of recesses which serve to receive chips and remove them from the groove. The axially projecting parts of the ring-shaped support section remaining between the recesses form support teeth or posts, with profiles corresponding to the groove to be machined and supporting plate seats to receive indexable, reversible cutting bits, or cutting plates. The posts are subjected to load predominantly in peripheral direction and to a lesser extent also in radial direction during forward feed of the bell-type countersink. The dimensioning can take this into account in that the posts are less thick in radial direction than in peripheral direction. For reinforcement and stiffening of the support section, the recesses essentially correspond in size to the posts and are shaped so that a web connecting the posts to one another is left between the individual posts.

It is advantageous if the fastening means for holding the cutting plates are releasable fastening means which, with a tangential arrangement of the reversible cutting plates, are accessible on their free face side. This is a direction of access which lies transversely to the periphery and forms an acute angle with the axial direction. The change of position and replacement of cutting plates is particularly simple in this case.

To construct a groove conventionally shaped symmetrically relative to a longitudinal central axis, two associated bell-type countersinks are preferably provided, of which one supports the cutting plates on the inner periphery side of the ring-shaped support section and the other is accordingly fitted with cutting plates on the outer periphery side of the ring-shaped support section. Although in principle the bell-type countersink could also support cutting plates on both sides, i.e. both on its inside and on its outside, the distribution to two bell-type countersinks forming an associated set means that the ring-shaped support section, e.g. a post 5, can be kept sufficiently thick. This is particularly important when machining narrow grooves. The radial thickness of the post is less than the width of the groove reduced by the profile depth.

The indexable and/or reversible cutting plates arranged on the bell-type countersink are arranged in rows, forming bit groups along the posts. These rows thus lie transversely to the peripheral direction and essentially parallel or at an acute angle to the axial direction of the tool. Each post preferably carries a small number (one to four) indexable reversible cutting plates per row. The forces acting on the individual posts are thus kept within suitable limits.

The cutting edges of the cutting plates of one row can be so aligned that compensation of forces relative to the components of the cutting forces acting in the axial direction is obtained. The consequence of this at least partial compensation of components of the cutting forces is that these are compensated or balanced within a post and do not have to be deflected via the tool or the tool spindle. This has a beneficial effect on the machining accuracy.

The cutting plates which, together provide a complete, composite cutting edge are preferably distributed onto several posts so that, for example, only two complete cutting edges are formed overall. Nevertheless a high machining speed is achieved because two complete cutting edges are guided over the entire length of the groove for machining, per rotation, of the bell-type countersink. The feed motion merely covers a few millimeters. Therefore, a cycle time of appreciably less than a minute is required to machine out the groove profile. In contrast to the machining time of 5 hours, for example, for 50 arc-shaped grooves distributed on the periphery of a turbine rotor, this enables the machining time to be reduced overall to less than half an hour. It has been possible in tests to reduce the machining times by appreciably more than 90%.

DETAILED DESCRIPTION

Figures 1, 1A:
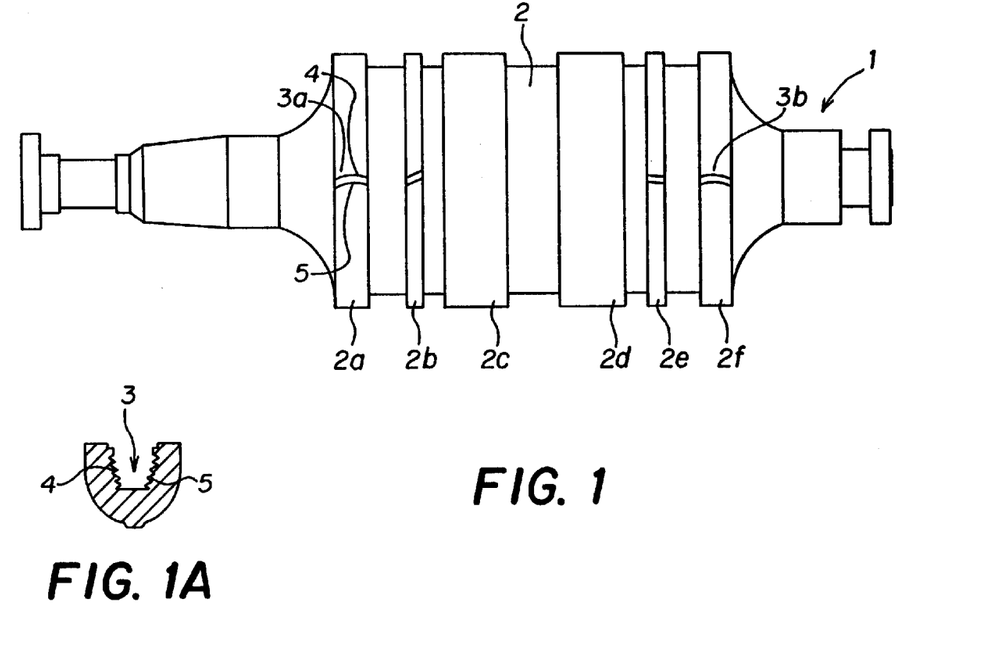
FIG. 1 is a schematic side view of a turbine rotor with arc-shaped grooves to be formed therein.
FIG. 1A is a fragmentary cross section of a turbine rotor ring illustrating the cross section of a curved cross groove.

FIG. 1 is a schematic view of a turbine rotor 1 which has several disc-shaped sections 2a to 2f spaced from one another in axial direction. While sections 2b to 2e have straight cross-grooves, sections 2a and 2f are provided with grooves 3a, 3b curved in a circular arc shape. The grooves 3a, 3b have a Christmas tree-shaped cross-section, indicated separately at FIG. 1A, and serve to hold and fasten turbine blades. On its opposing flanks 4, 5, the grooves (3a, 3b) have longitudinally extending webs with recesses defined between them.

Figure 2:
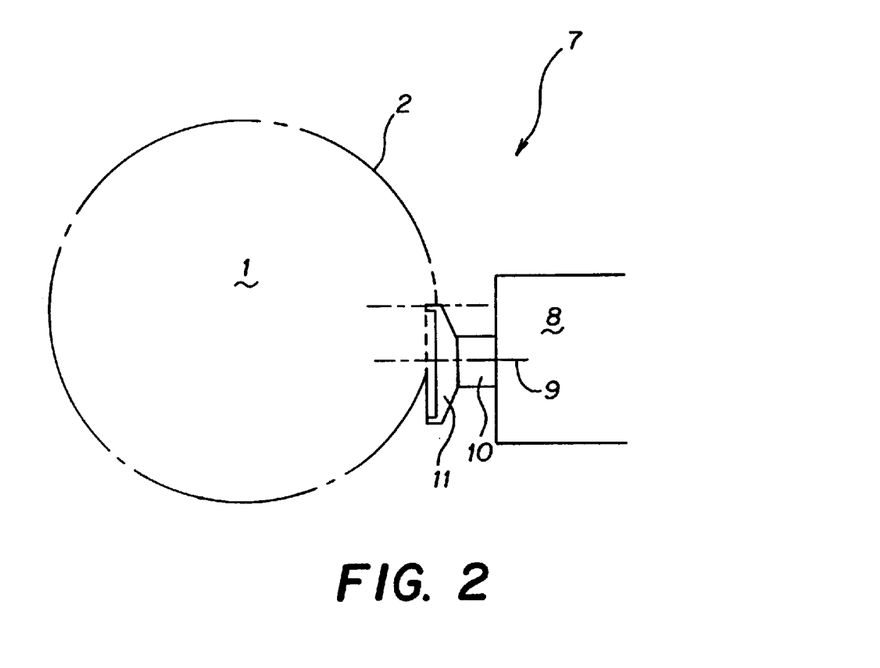
FIG. 2 shows a milling unit with bell-type countersink for profiling a previously opened, arc-shaped groove, in a highly schematic view onto the face side of the rotor (front view)

To construct the grooves 3 profiled as shown in FIG. 1A firstly with a uniform reduced dimension relative to the desired rated size, a milling machine 7 shown schematically in FIG. 2 with an axially movable spindle head 8 is used, i.e. one which may be moved towards and away from the turbine rotor 1. This spindle head supports a cup-shaped or pot-shaped bell-type countersink 11, as shown separately in FIG. 3, on its preferably horizontal cutting spindle 10 which is rotatable around a rotational axis 9.

The bell-type countersink 11 has an approximately pot-shaped tool body 12 (FIG. 3) with an essentially plane base 13, away from which an edge constructed as a ring-shaped support section 14 and arranged coaxially to the rotational axis 9 extends in axial direction.

Figure 3:
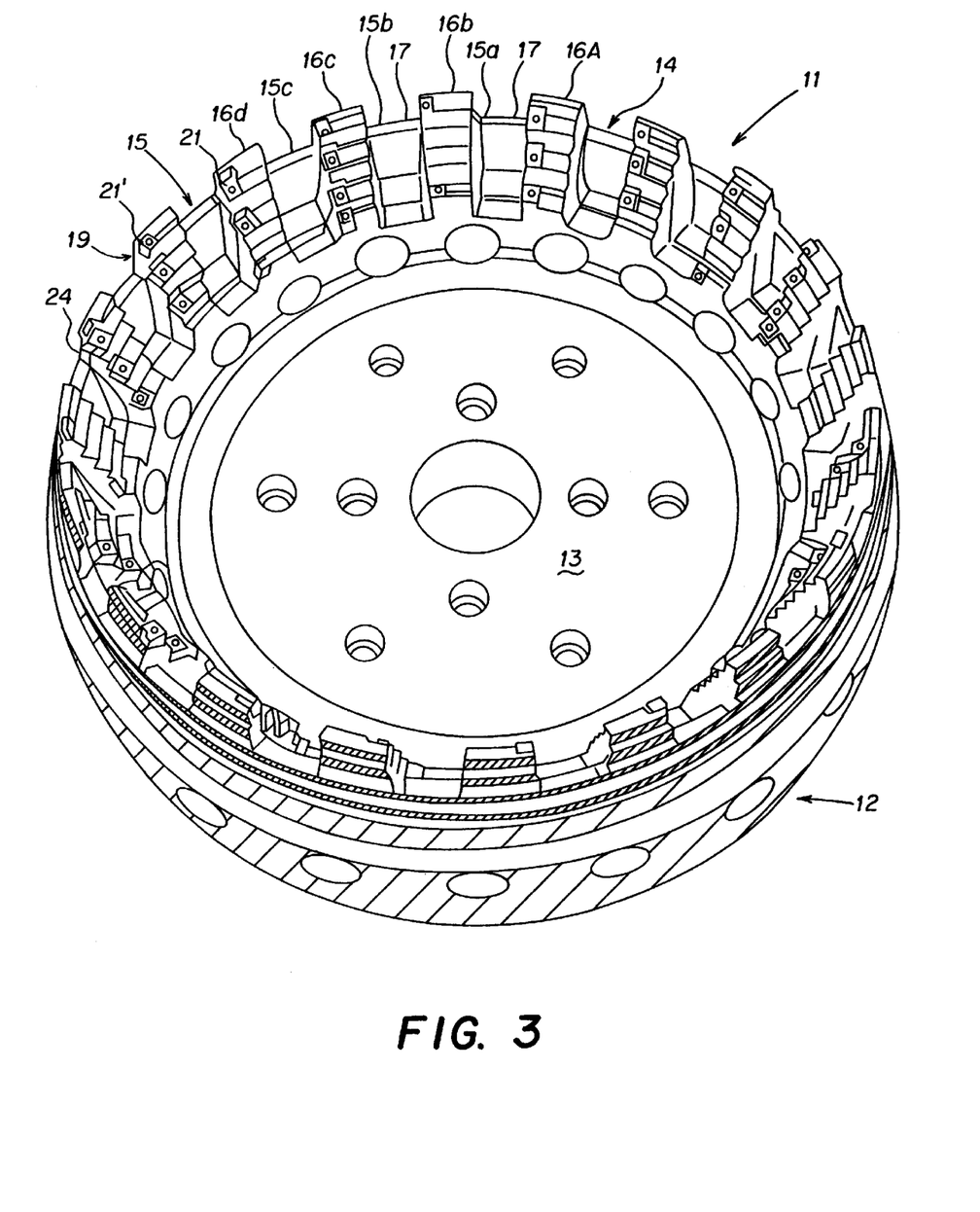
FIG. 3 shows the bell-type countersink according to FIG. 2 in a perspective general view.

In accordance with a feature of the invention, recesses 15, 15a, 15b, 15c, . . . , which open radially inwardly, outwardly and axially away from the base 13, are spaced from one another in peripheral direction in the support section 14 so that posts 16 (16a, 16b, 16c, . . . ), which are equal in size to one another and extend away from the base 13 in axial direction, are formed between the recesses 15. Adjacent posts are respectively connected to one another via a web 17 which at least, radially outwardly, partially covers the respective recess 15. The height of the webs 17 in axial direction is less than the height of the posts 16 which are equal in size to one another.

While the posts are constructed with a stepped arrangement in axial direction free from undercuts on their side lying radially on the outside, the profile on their respective side lying radially on the inside corresponds to the flank profile of the groove 3 shown in FIG. 1. The side lying on the outside has steps 18, which are given reference letters a to d in FIG. 4 to distinguish between them. The steps are respectively formed by an axial surface following the peripheral face of a cylinder and an oblique shoulder, which lies on an envelope of cone. The steps 18 are constructed so that the bell-type countersink can be run axially into an opened groove free from undercuts without touching the flank 4 of the groove 2.

On their profiled (inner) side, the posts 16 are provided with plate seats 19 (FIG. 3), on which indexable, including reversible cutting bits, or inserts, or plates 21 are held. The inside has ribs 20 which have been given reference letters a to d, FIG. 6, collectively, which correspond to the number of undercuts to be formed, here five, individually project axially inwards and extend in peripheral direction. The plate seats 19 are provided on the ribs 20. Two plate seats are omitted on all the ribs 20 for one cutting edge located one behind the other in peripheral direction. The cutting edges are formed on a group of indexable and/or reversible cutting plates, the cutting edges of which project one above the other in peripheral direction to fully define the contour of the groove flank.

The indexable cutting plates are generally rectangular blocks, i.e. square when viewed from the top. The indexable cutting plates 21' at the end can be constructed in a different shape however. The indexable cutting plates 21, 22' are arranged tangentially, i.e. they are seated on plate seats 19, their engagement surfaces lying substantially in peripheral direction. screws 24 pass through the indexable and/or reversible cutting plates 21 at central openings and are screwed into threaded holes formed in the plate seats 19.

The bell-type countersink 11 shown in FIG. 3 forms four cutting edges overall, each of which being respectively distributed over five posts 16. This means that the indexable and/or reversible cutting plates 21 of a first post group 16 fully define the desired contour of the flank 5 with their respectively active cutting edges. Only one cutting edge is active on each indexable and/or reversible cutting plate 21. The bell-type countersink 11 with four complete cutting edges has four such post groups. If necessary, it is also possible to set the number of cutting edges at a higher or lower number.

Figure 4:
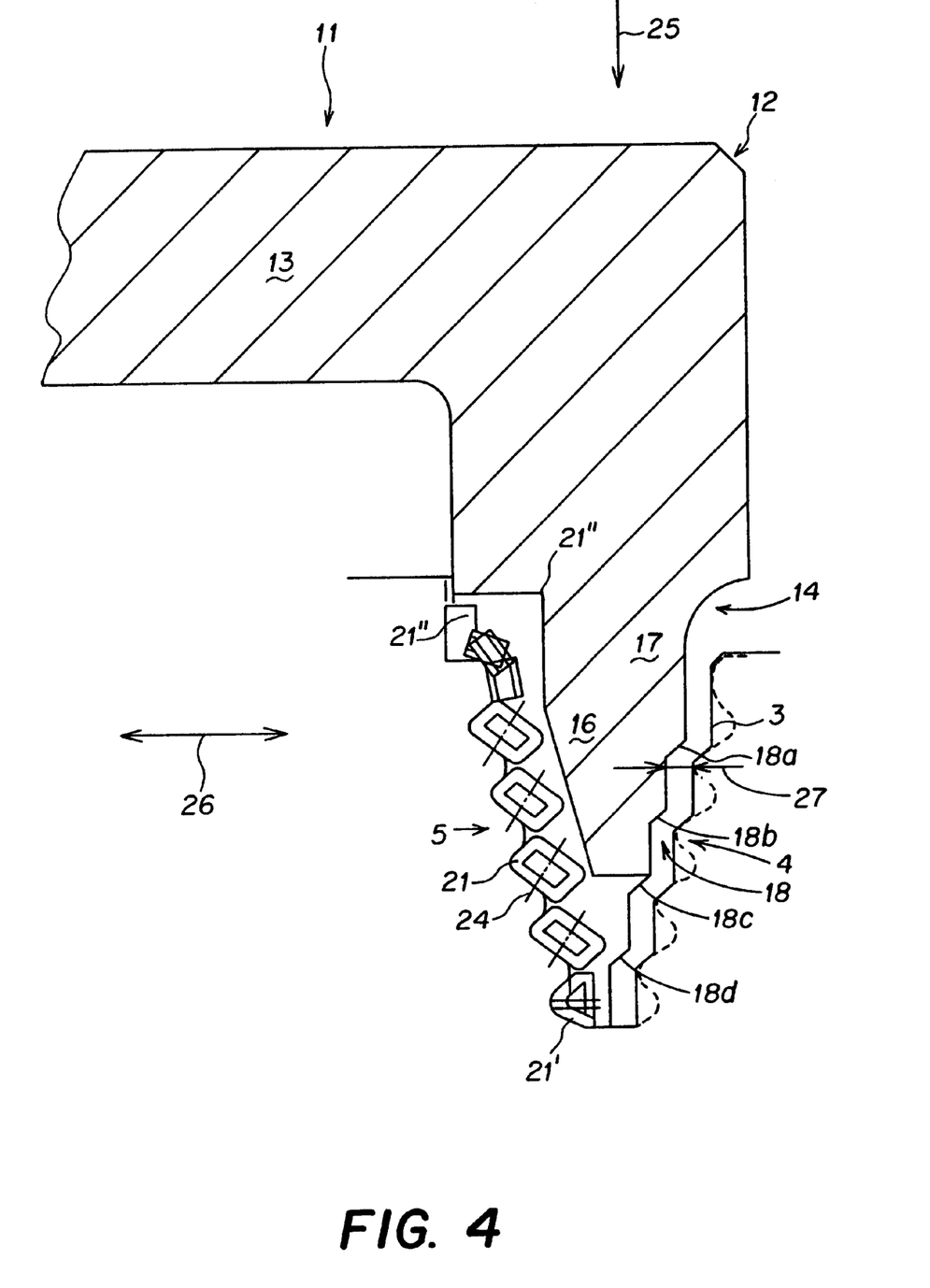
FIG. 4 is a schematic representation of the bell-type countersink according to FIG. 3, partially in longitudinal section with a schematic projection of all indexable and/or reversible cutting plates belonging to one cutting edge into a plane enclosing the axial and the radial.

To illustrate the position of the individual reversible cutting plates 21 belonging to one cutting edge, they are shown in FIG. 4 in projection along the periphery into the plane of the drawing. It is evident from this that the complete cutting edge defined by the cutting plates 21 defines a total of 5 undercuts relative to the axial direction indicated by an arrow 25. The cutting plates provided to form the flanks 5 of the grooves 3 are constructed in an essentially rectangular block shape with the exception of the reversible cutting plate at the end, in which case the corresponding plate seats 19 lying in peripheral direction are inclined uniformly against the radial direction, shown by arrow 26. In accordance with this, the fastening screws 24 are accessible from the inside of the tool body 12.

The cutting plate 21' at the end has an approximately triangular cross-section 21. In addition, indexable cutting plates 21" lying on the inside are provided with are used to machine the edge of the groove 3.

While the contour of the bell-type countersink 11 is defined on its inside by the indexable cutting plates 21, 21', 21", it is defined on the outer peripheral surface by the outsides of the posts 16. The profile of the bell-type countersink 11 is free from undercuts here. The ring-shaped support section 14 formed by the posts 16 is tapered in axial direction (arrow 25) over the length of the posts 16 in a stepped arrangement. The steps are dimensioned so that the bell-type countersink 11 may be fed into the pre-made groove 3, shown in broken lines in FIG. 4, while its posts 16 equipped with reversible cutting plates without touching the flanks 4, 5 of the groove 3. An additional dimension specification is required with respect to the distance 27 between the cutting blade abutting the associated flank 5, as well as the outer peripheral surface of the posts 16 and the groove flank 3. This additional clearance space permits the posts 16 to enter into the groove 3 in axial direction (arrow 25) without touching the flanks.

Figure 5:
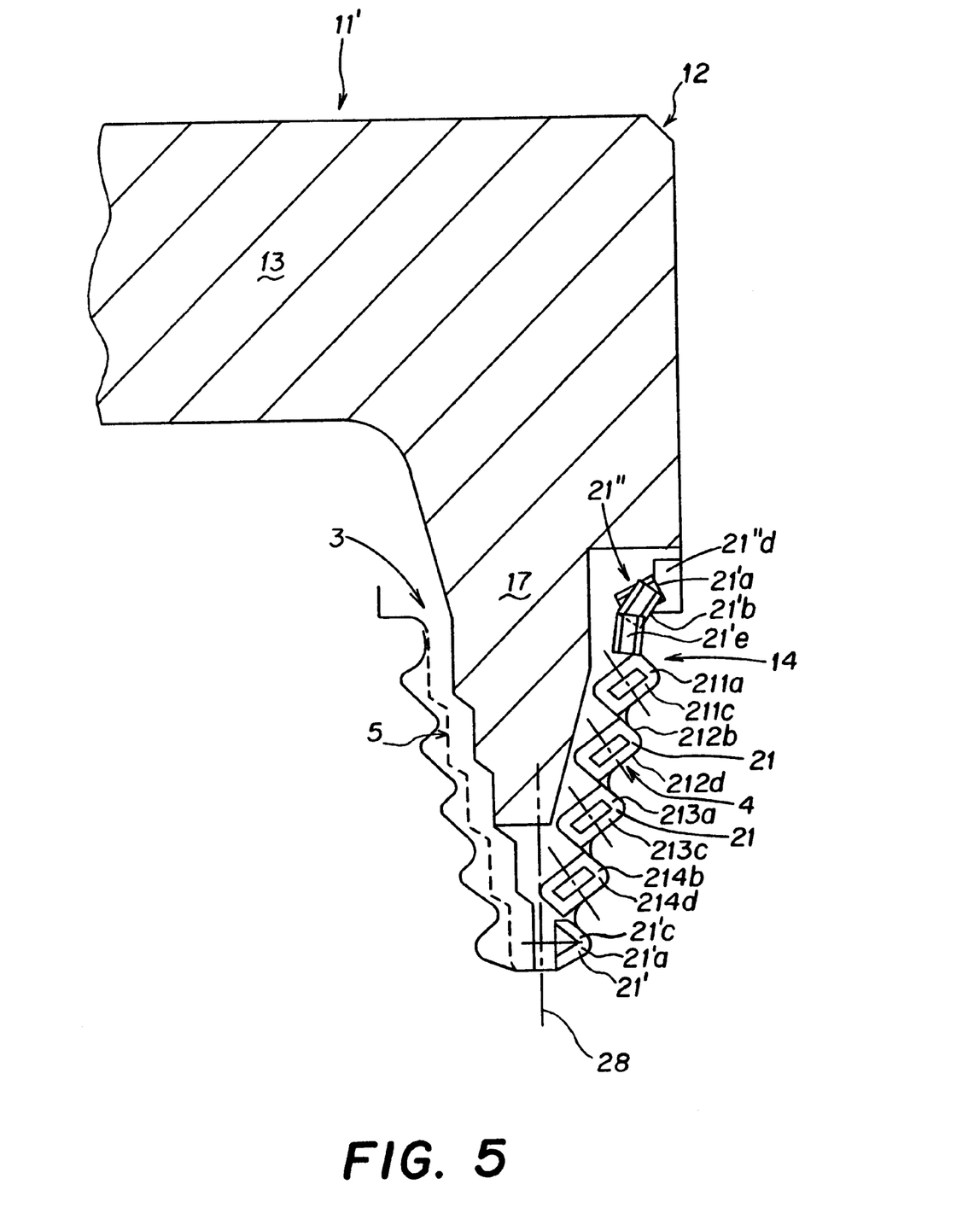
FIG. 5 is a schematic representation in longitudinal section of a bell-type countersink profiled in its outer peripheral surface, with a projection of all the indexable and/or reversible cutting plates belonging to one cutting plate into the plane of the drawing.

FIG. 5 shows a corresponding bell-type countersink 11' fitted on its outside with reversible cutting plates 21, 21', 21". Its support section 14 is constructed symmetrically to a longitudinal central plane 28 of the groove 3 curved in the shape of a circular arc and shown in FIG. 5 by a dot-dash line. The form and arrangement of the reversible cutting plates 21, 21', 21" and those of the plate seats 19 are the same as described for the bell-type countersink 11 shown in FIG. 4. Similarly, the following description of the arrangement of the reversible cutting plates 21, 21', 21" of the bell-type countersink 11' in association with FIGS. 6A to 6E and FIG. 7 applies to the bell-type countersink 11 with its reversible cutting plates 21, 21', 21" arranged on the inside.

As FIG. 6 collectively shown, the indexable and/or reversible cutting plates 21, 21', 21" belonging to a complete cutting blade are distributed over a total of 5 posts 16a, 16b, 16c, 16d, 16e. These posts 16a to 16e are posts of the support section 14 arranged one after the other in peripheral direction. The post 16a carried a total of four cutting plates. These are a generally rectangular block shaped indexable and/or reversible cutting plate 21" a for machining the groove edges, a first cutting plate 211a for forming or machining an undercut located closest to the groove base, a cutting plate 213a for forming the undercut of flank 4 after this, and a cutting blade 21; essentially triangular in cross-section for forming the undercut located closest to the groove base.

Figure 6A:
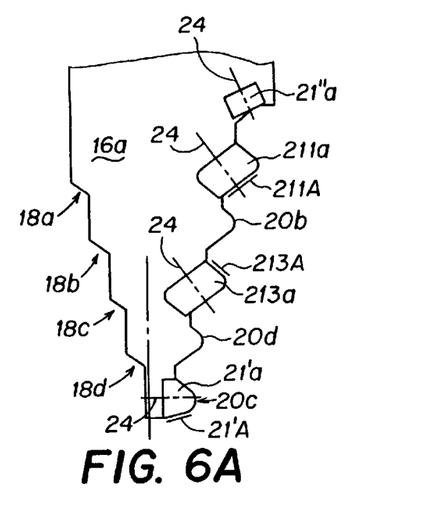
FIGS. 6A to 6E show 5 posts of the bell-type countersink according to FIG. 5 in a sectional, partially simplified, representation of the posts supporting reversible cutting plates in different configuration to form one complete, composite cutting edge.

The distance between cutting plate 211a and cutting plate 213a is essentially the same as the distance between cutting plate 213a and cutting plate 21'a. One plate position is free respectively between the mentioned cutting plates, and no plate seats or cutting plates are arranged therein.

Figure 6B:
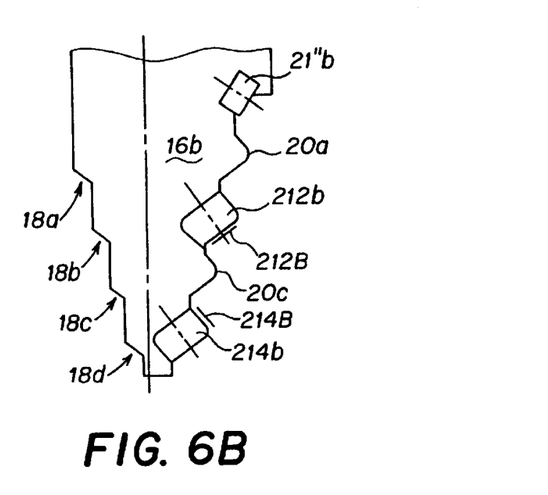

The post 16b following in the direction of rotation is shown in FIG. 6B. It carries a generally rectangular block-shaped cutting plate 21"b for machining the groove edge, as well as two further indexable and/or reversible cutting plates 212b, 214b for machining the second and fourth undercuts, as viewed from the groove edge. In turn, a plate position is respectively left free between the individual cutting plates, and the distances between the cutting plates are essentially equal to one another.

Moreover, it is evident that cutting plates 212b, 214b are staggered with cutting plates 211a, 213a, 21'a of the post 16a ahead thereof.

Figure 6C:
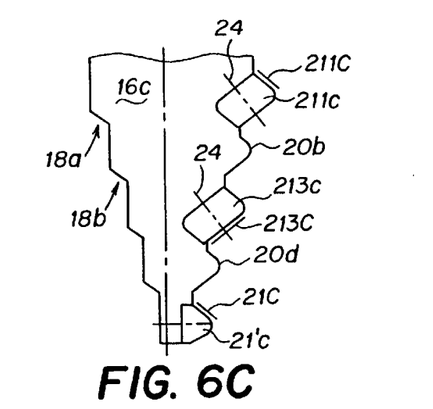
Figure 6D:
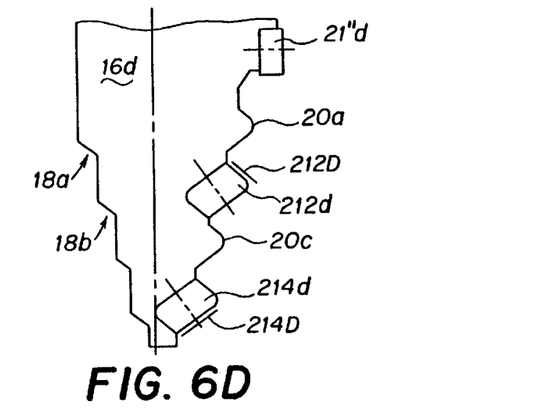

This also applies to the subsequent post 16c which carries indexable and/or reversible cutting plates 211c, 213c, 21'c for machining the first, third and fifth grooves, as viewed from the groove edge. The distance between adjacent cutting plates are also uniformly fixed at this post 16c, as in the case of the subsequent posts 16d (FIG. 6D). Post 16d has three cutting plates 21"d, 212d and 214d. While cutting plate 21"d serves to machine the groove edge, cutting plates 212d, 214d are provided for machining the second and fourth undercuts and are staggered with reversible cutting plates 211c, 213c, 21'c of the post 16c ahead.

Figure 6E:
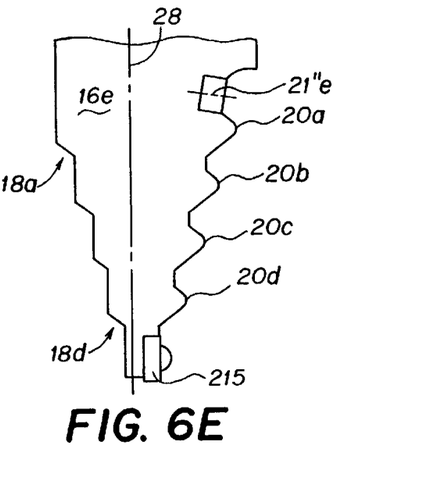

This also applies in principle to the subsequent post 16e, which only carries one cutting plate 211e for machining the groove edge in the transition area to the first recess and at the end carries an essentially flat cutting plate 215 for machining the groove base.

With respect to the undercuts to be formed, the first and third posts 16a, 16c machine the first, third and fifth undercuts, whilst the second and fourth posts 16d, 16d machine the second and fourth undercuts. Each undercut is formed by two overlapping cutting plates. The preceding reversible cutting plate 211a is active with its cutting edge 211A facing towards the groove base, whilst the allocated cutting plate 211c behind, in direction of rotation, is active with its cutting edge 211C pointing away from the groove base.

Figure 7:
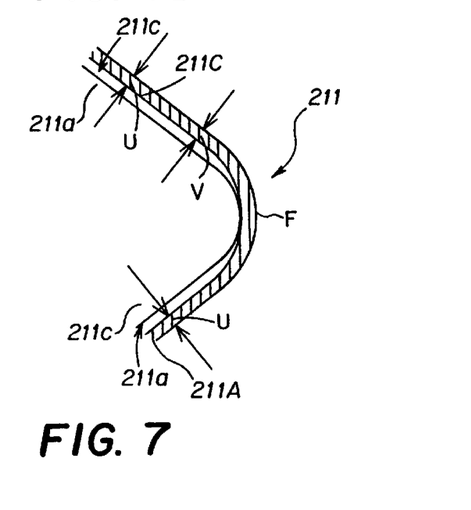
FIG. 7 is a schematic representation of the adjustment of two cooperating indexable and/or reversible cutting plates of the bell-type countersink according to FIG. 3 milling a longitudinal recess into the groove wall relative to the desired dimension.

Conditions are exactly reversed with indexable and/or reversible cutting plates 213a, 213c for the third undercut. Cutting plate 213a is active with its cutting edge 213A facing away from the groove base, whilst cutting plate 213c is active with its cutting edge 213C facing towards the groove base. Finally, cutting plate 21'a cuts with its cutting edge 21'A on the base side, while cutting plate 21'c is active with its cutting edge 21'C pointing away from the groove base. This is achieved in all three mentioned plates 211, 213, 21' by a slight axial displacement of the respective cutting plates relative to one another, as is shown in FIG. 7 on the basis of cutting plates 211a, 211c of the plate pair 211. Both cutting plates 211a, 211c are projected in to the plane of the drawing in order to show the overlapping arrangement of their cutting edges 211A, 211C. The use of only one cutting edge of each cutting plate in each case is achieved by a displacement V of the cutting plates relative to one another. In the projection, both cutting edges 211A, 211C define a contour which has a uniform reduced dimension U in relation to a finally desired form F of the undercut.

Corresponding conditions apply for indexable and/or reversible cutting plates 213a, 213c, as well as for reversible cutting plates 21'a, 21c. Because of the respectively alternating arrangement of active cutting edges on each post 16a, 16c, i.e. cutting edge 211a is oriented downwards, the next cutting edge 213A is oriented upwards and the next cutting edge 21'A is oriented downwards again, substantial compensation of the axial components of the cutting forces is achieved in each post, resulting in excellent machining accuracy. It may generally be said of the arrangement of the cutting edges of adjacent cutting plates of a post that they together form an angle which opens radially inwards or outwards and its bisecting line is essentially oriented in radial direction.

The above description applies equally to posts 16b, 16d. Cutting plates 212b, 212d form a plate pair 212 for machining the fourth undercut, i which case cutting edge 212B is oriented towards the groove base and cutting edge 212D is oriented away from the groove base. Conversely, cutting edge 214B is oriented away from the groove base and cutting edge 214D is oriented towards the groove base.

OPERATION

Figure 8A:
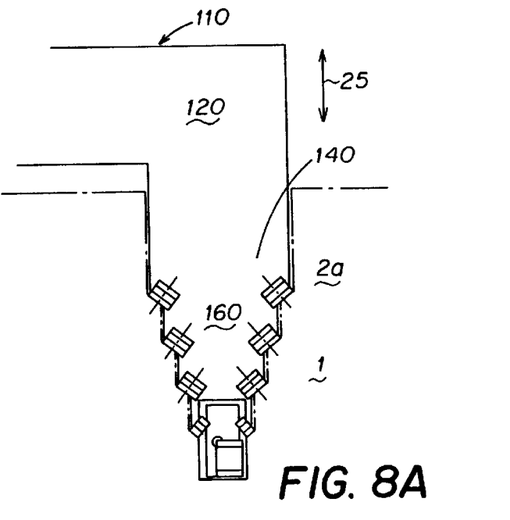
FIGS. 8A and 8B are schematic representations showing the opening of a groove (FIG. 8B) with rough contour by axial forward feed of an appropriately constructed bell-type cutter (FIG. 8A), free from undercuts, in a first working step.
Figure 8B:
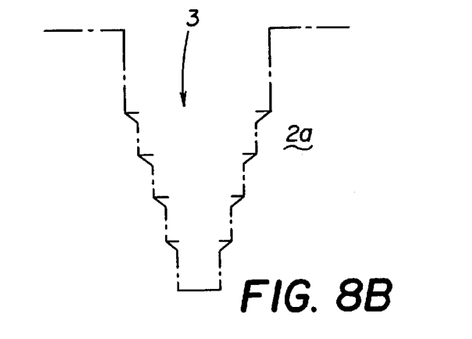

During machining or formation of arc-shaped grooves 3 in a turbine rotor 2, the above-described bell-type countersink 11 is used in the following manner:

In a first working step shown in FIGS. 8A, 8B, a bell-type countersink, known per se and shown schematically in FIG. 8A, is moved towards section 2a of the turbine rotor 1 in the axial direction indicated by arrow 25. The bell-type cutter 110 circulating about its rotational axis 9 (FIG. 2) has reversible cutting plates both on the inside and the outside in the case of the ring-shaped support section 140 of its pot-shaped tool body 120. These reversible cutting plates determine a profile which tapers in steps. After an axial forward feed corresponding approximately to the depth of the desired groove 3, the groove 3 is firstly opened with a contour tapering in steps and without undercuts, as shown in FIG. 8B.

Figure 9A:
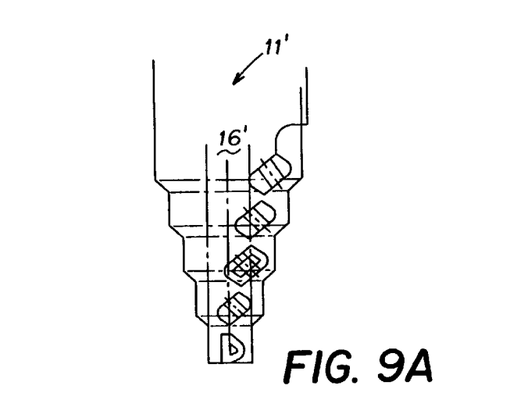
FIGS. 9A and 9B are schematic representations of the structure of the desired profiling of one of the two groove flanks with a bell-type countersink according to FIG. 5, in a second working step.
Figure 9B:
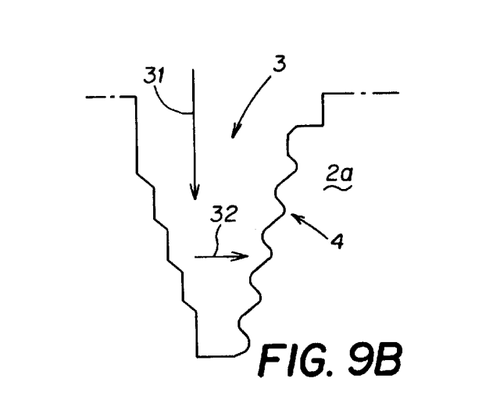

After the groove 3 has been roughly opened in the rough cutting process, the bell-type countersink 11' shown schematically and in fragmentary form in FIG. 9A comes in to use, being run into the rough-formed groove 3 in an in-feed or plunging movement. Its rotational axis 9 (FIG. 2) in this case is essentially displaced relative to the center of curvature of the arc-shaped groove 3 to be formed by the depth of the undercut so that the bell-type countersink 11' plunges into the groove 3 without touching the walls or flanks. The plunging or in-feed movement is indicated in FIG. 9B with an arrow 31. This ends as soon as the reversible cutting plate 215 at the end, shown in FIG. 6E, is inserted into the roughly pre-formed groove base to the desired depth. The rough cut leaves the groove with at least an undersized groove.

This movement is followed by the radial or lateral feed movement shown in FIG. 9B by an arrow 32. All the cutting plates 21, 21', 21" (FIG. 5) now engage with the corresponding flank of the groove 3, whereupon the groove form shown in FIG. 9B is formed with the accuracy evident from FIG. 7 in a short forward feed motion corresponding to the depth of the undercut. The entire flank 4 is cut, yet leaving all undercuts with a small constant reduced dimension in relation to the desired groove width. Both the groove base and the groove edge to be constructed by cutting plates 21" may be produced in correct dimension with the desired surface quality, if required. After the feed motion has ended, the rotational axis 9 of the bell-type countersink 11' corresponds to the center of curvature of the groove to be formed. The radius of the bell-type countersink 11 thus determines the curvature of the groove 3.

The feed motion is very short and on every rotation of the bell-type countersink 11, each of its cutting edges is run once over the entire length of the groove 3. The resulting machining time is very short because the radial or lateral feed motion is only brief and because the entire flank 4 is simultaneously machined over the entire groove length.

In order to run the bell-type countersink 11' out of the groove 3, it is moved radially away from the flank 4 until all the cutting plates 21, 21', 21" are brought out of the undercuts of the flank 4. The bell-type countersink 11' is then removed axially from the groove 3 without touching the flanks 4.

Figure 10A:
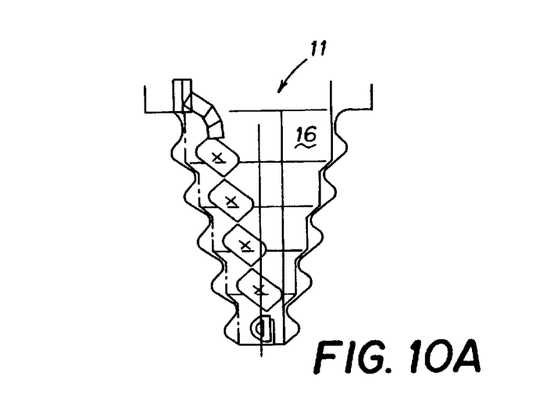
FIGS. 10A and 10B are schematic representations of the structure of the opposite groove flank with a bell-type countersink according to FIG. 4.
Figure 10B:
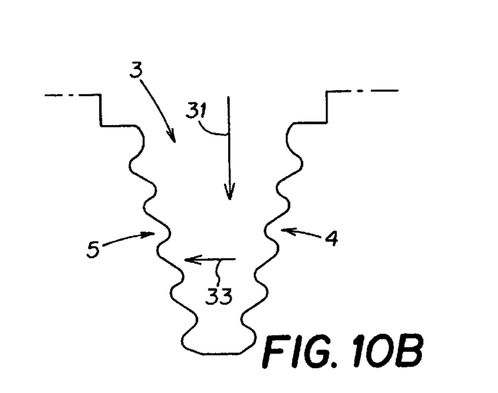

After the bell-type countersink 11' has been removed from the groove 3, the bell-type countersink 11 is run into the groove 3 eccentrically, i.e. without touching the flanks 4, 5 of the groove 3, as shown in FIGS. 10A, 10B. The now following countersinking process gives the flank 5 of the groove 3 the form shown in FIG. 10B. A radial feed motion in the direction of arrow 33 is indicated, in which the rotational axis 9 (FIG. 2) of the bell-type countersink 11 is shifted in parallel to the eccentricity. The statements in connection with FIG. 8 apply with respect to the machining time and quality.

The thus far rough-machined groove 3 is finished in a last working step with a profiling cutter, preferably a shaft-type profiling milling cutter, which is run along through the groove 3 with both flanks 4, 5 being simultaneously engaged. Because the material thickness, which corresponds to the reduced dimension U shown in FIG. 7, is quite small and is to be removed uniformly, only little chip removal is required and the process may be run at high forward feed. The profiling milling cutting remains dimensionally accurate for a long time.

Figure 11:
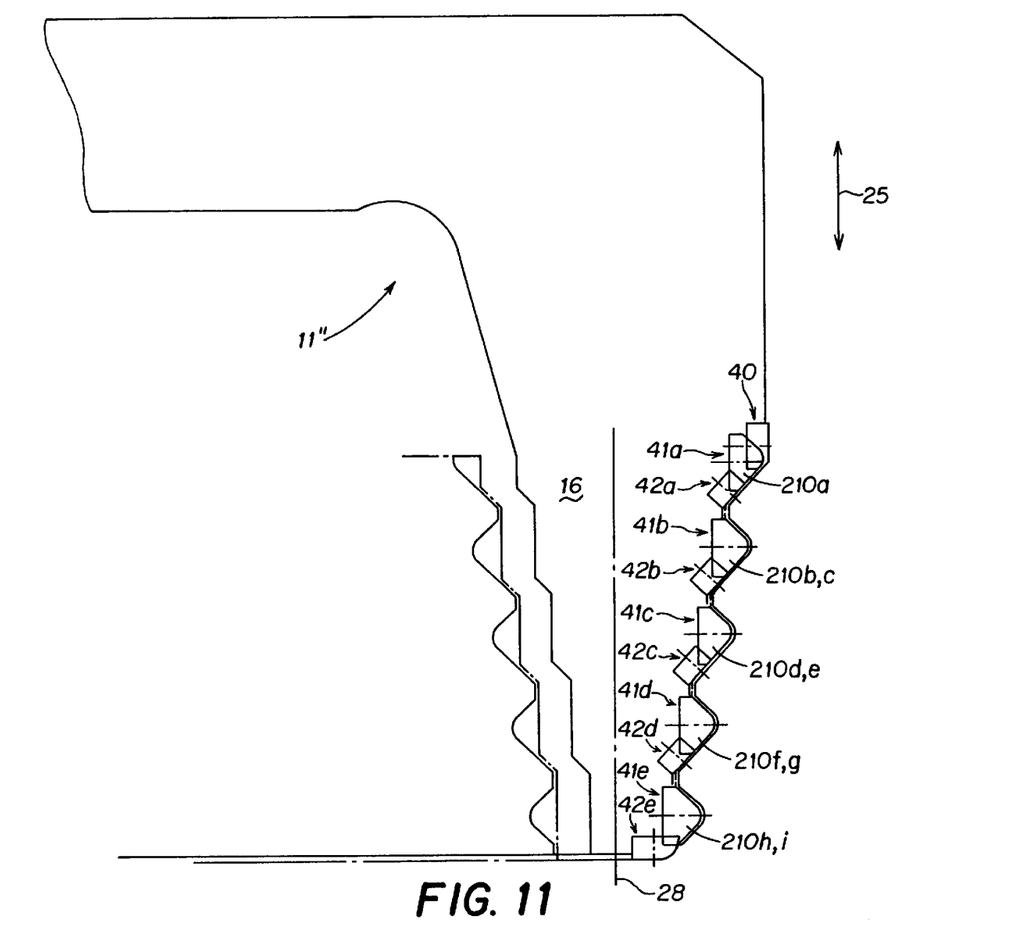
FIG. 11 is a schematic representation of an alternative embodiment of a bell-type countersink profiled on its outside, with a projection of its reversible cutting plates belonging to a complete cutting edge into the plane of the drawing.

FIG. 11 shows a modified embodiment of a bell-type countersink 11". This differs from the above-described bell-type countersink 11', 11 only in the structure of the plate seats and the form of the indexable and/or reversible cutting plates 210 or to 210i attached thereto. Like the bell-type countersink 11, bell-type countersink 11" has individual posts 16 which are projected one above the other in FIG. 11. Several posts belong to a single cutting edge, and each post carried one to two, four at maximum, reversible cutting plates. The plate seats 40, 41, 42 (a to d) are individually provided for tangential arrangement of the respective cutting plates. They have an abutting surface lying in peripheral direction with a corresponding radially oriented supporting surface to absorb the cutting forces.

Figure 12:
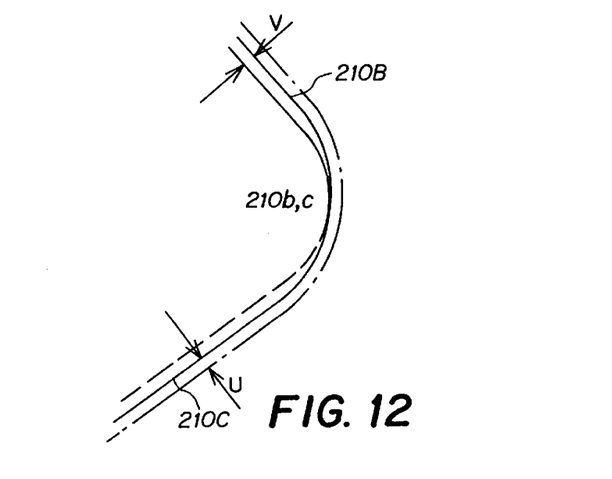
FIG. 12 shows the adjustment of the cutting edges of the indexable cutting plates of the bell-type countersink according to FIG. 11 in relation to the groove profile to be formed.

The undercuts are constructed by means of cutting plates 210a to 210i corresponding in cross-section to the form of the respective undercut. As already described in the above embodiments of the bell-type countersinks 11, 11', the reversible cutting plates 210b to 210i are formed by one respective reversible cutting plate pair, the cutting edges of which are offset in relation to one another in axial direction (arrow 25). This is shown in FIG. 12 which essentially corresponds to FIG. 7 and in which cutting edge 210B of cutting plate 210b protrudes over the respective other cutting plate on the side facing away from the groove base, and the cutting edge 210C of cutting plate 210c protrudes over the respective other cutting plate on the side facing towards the base, and are thus active. The statements made in connection with FIGS. 6A to 6E apply with respect to the distribution of cutting plates 210 on the different posts 16 and the different undercuts.

In brief, for the production of circular arc-shaped rotor grooves with Christmas tree-shaped cross-section in turbine rotors, bell-type countersinks 11, 11', 11" are provided which are fed into the roughly contoured arc-shaped groove after it has been opened and are fed laterally towards the flank of the groove. Such a bell-type countersink has a pot-shaped tool body 12, from the base 13 of which a ring-shaped support section 14 with individual posts 16 extends. On their inside and outside, the posts carry reversible cutting plates which determine the flank profile of the groove by their overlapping arrangement. Such bell-type countersinks allow machining of circular arc-shaped grooves to be accomplished in a time which is drastically reduced compared to the time required for machining with conventional profiling cutters.

We claim:

1. Bell-type countersink (11) for machining arc-shaped grooves (3) in work pieces (1) which are cylindrical at least in sections, having a tool base body (12), which has a ring-shaped support section (14) arranged coaxially to a rotational axis (9), and comprising:
plate seats (19) formed on the support section (14, 16);
at least one group of indexable and reversible cutting plates (21, 21'), and
fastening means (24) for receiving and retaining the cutting plates (21, 21', 21"),
wherein on rotation of the tool base body (12) about the rotational axis (9) said reversible cutting plates (21, 21', 21") define with their active cutting edges a peripheral outline coaxial to the rotational axis,
wherein said plates are secured on the support section (14, 16) to form, in operation, in the direction of the rotational axis (9), at least one undercut, and wherein the peripheral outline defined by the cutting edges of the reversible cutting plates (21, 21', 21") is a ring surface stepped or undulated in an axial direction.

2. Bell-type countersink according to claim 1, characterized in that the ring-shaped support section (14) has a series of spaced recesses (15), and a series of posts (16) separated by said recesses and carrying cutting plates (21, 21', 21").

3. Bell-type countersink according to claim 1, characterized in that the ring-shaped support section (14) is divided by recesses (15).

4. Bell-type countersink according to claim 2, characterized in that the posts (16) and recesses (15) correspond essentially in size.

5. Bell-type countersink according to claim 2, characterized in that the plate seats (19) are constructed on the posts (16).

6. Bell-type countersink according to claim 1, characterized in that the fastening means (24) are accessible on a free face side relative to the cutting plates (21, 21', 21") and are arranged on the plate seats (19).

7. Bell-type countersink according to claim 1, characterized in that the cutting plates (21, 21', 21") are arranged on one of: solely on the outer peripheral side of the ring-shaped support section (14); solely on the inner peripheral side of the ring-shaped support section (14).

8. Bell-type countersink according to claim 1, characterized in that the cutting plates (21, 21', 21") are arranged on the support section (14) in grouped rows respectively extending obliquely to the direction of rotation of the tool base body (12).

9. Bell-type countersink according to claim 8, characterized in that at least two of the cutting plates (21, 21', 21") of said grouped rows have differently oriented active cutting edges.

10. Bell-type countersink according to claim 8, characterized in that two reversible cutting plates (211a, 213a) belong to a group of reversible cutting plates (21, 21', 21") arranged in a row, and their cutting edges (211A, 213A) together form an angle, the bisecting line of which lies essentially in a radial direction.

11. Bell-type countersink according to claim 8, characterized in that the reversible cutting plates (21, 21', 21") of several rows arranged one behind the other together define a complete cutting blade.

12. Bell-type countersink according to claim 7, wherein the cutting plates (21, 21', 21") are arranged solely on the outer peripheral side of the ring-shaped support section (14).

13. Bell-type countersink according to claim 7, wherein the cutting plates (21, 21', 21") are arranged solely on the inner peripheral side of the ring-shaped support section (14).

14. Bell-type countersink (11) for machining arc-shaped grooves (3) in work pieces (1) which are cylindrical at least in sections, having a tool base body (12), which has a ring-shaped support section (14) arranged coaxially to a rotational axis (9), comprising:

plate seats (19) formed on the support section (14, 16);

at least one group of indexable and reversible cutting plates (21, 21'); and fastening means (24) for receiving and retaining the cutting plates (21, 21', 21"), wherein on rotation of the tool base body (12) about the rotational axis (9) said reversible cutting plates (21, 21', 21") define with their active cutting edges a peripheral outline coaxial to the rotational axis, wherein said plates are secured on the support section (14, 16) to form, in operation, in the direction of the rotational axis (9), at least one undercut, and wherein the cutting plates (21, 21', 21") are arranged on the support section (14) in grouped rows respectively extending obliquely to the direction of rotation of the tool base body (12).

15. Bell-type countersink according to claim 14, characterized in that at least two of the cutting plates (21, 21', 21") of one of said grouped rows have differently oriented active cutting edges.

16. Bell-type countersink according to claim 14, characterized in that two reversible cutting plates (211a, 213a) belong to a group of reversible cutting plates (21, 21', 21") arranged in a row, and their cutting edges (211A, 213A) together form an angle, the bisecting line of which lies essentially in a radial direction.

17. Bell-type countersink according to claim 14, characterized in that the reversible cutting plates (21, 21', 21") of several rows arranged one behind the other together define a complete cutting blade.

18. Bell-type countersink (11) for machining arc-shaped grooves (3) in work pieces (1) which are cylindrical at least in sections, having a tool base body (12), which has a ring-shaped support section (14) arranged coaxially to a rotational axis (9), comprising:

plate seats (19) formed on the support section (14, 16);

at least one group of indexable and reversible cutting plates (21, 21'); and fastening means (24) for receiving and retaining the cutting plates (21, 21', 21"), wherein on rotation of the tool base body (12) about the rotational axis (9) said reversible cutting plates (21, 21', 21") define with their active cutting edges a peripheral outline coaxial to the rotational axis, wherein said plates are secured on the support section (14, 16) to form, in operation, in the direction of the rotational axis (9), at least one undercut, and wherein the cutting plates (21, 21', 21") are arranged solely on an outer peripheral side of the ring-shaped support section (14).

19. Bell-type countersink (11) for machining arc-shaped grooves (3) in work pieces (1) which are cylindrical at least in sections, having a tool base body (12), which has a ring-shaped support section (14) arranged coaxially to a rotational axis (9) comprising:

plate seats (19) formed on the support section (14, 16);

at least one group of indexable and reversible cutting plates (21, 21'); and fastening means (24) for receiving and retaining the cutting plates (21, 21', 21");

wherein on rotation of the tool base body (12) about the rotational axis (9) said reversible cutting plates (21, 21', 21") define with their active cutting edges a peripheral outline coaxial to the rotational axis;

wherein said plates are secured on the support section (14, 16) to form, in operation, in the direction of the rotational axis (9), at least one undercut; and wherein the cutting plates (21, 21', 21") are arranged solely on an inner peripheral side of the ring-shaped support section (14).

* * * * *

UNITED STATES PATENT AND TRADEMARK OFFICE
CERTIFICATE OF CORRECTION

PATENT NO. : 5,911,548
DATED : June 15, 1999
INVENTOR(S) : Siegfried DEISS et al.

It is certified that error appears in the above-identified patent and that said Letters Patent is hereby corrected as shown below:

Title page,
Item [56] under "OTHER PUBLICATIONS", insert --"Quelle Cloche", MACHINES PRODUCTION, Nr.228, April 18, 1979, (XP-002055786).--.

Signed and Sealed this

Twenty-seventh Day of June, 2000

Attest:

Q. TODD DICKINSON

*Attesting Officer*  *Director of Patents and Trademarks*